United States Patent
Mason

(10) Patent No.: US 7,154,474 B2
(45) Date of Patent: Dec. 26, 2006

(54) COMPUTER MOUSE WITH FRAGRANCE EMITTING MEANS

(76) Inventor: Robin Gwen Mason, 7261 Shore Rd. #1U, Brooklyn, NY (US) 11209

(*) Notice: Subject to any disclaimer, the term of this patent is extended or adjusted under 35 U.S.C. 154(b) by 1358 days.

(21) Appl. No.: 09/767,068

(22) Filed: Jan. 23, 2001

(65) Prior Publication Data

US 2003/0231165 A1    Dec. 18, 2003

(51) Int. Cl.
*G09G 5/08* (2006.01)
(52) U.S. Cl. .................... 345/163; 345/164; 345/167; D14/402
(58) Field of Classification Search ........ 345/163–167, 345/156; D14/402–410
See application file for complete search history.

(56) References Cited

FOREIGN PATENT DOCUMENTS

| DE | 20010493 U1 | * | 10/2000 |
| JP | 11282621 A | * | 10/1999 |
| JP | 2000259345 A | * | 9/2000 |

* cited by examiner

*Primary Examiner*—Amr A. Awad
*Assistant Examiner*—Stephen G Sherman
(74) *Attorney, Agent, or Firm*—Goldstein Law Office P.C.

(57) ABSTRACT

A computer mouse having a housing with a bottom surface which rests upon a horizontal operating surface. A tracking device is positioned in the housing for generating pointer control data. A fragrance emitting means is contained within the housing of the computer mouse and is in communication with the tracking device. When the computer mouse is slid upon the operating surface, the fragrance particles housed within the computer mouse are dispersed into the surrounding air.

3 Claims, 2 Drawing Sheets

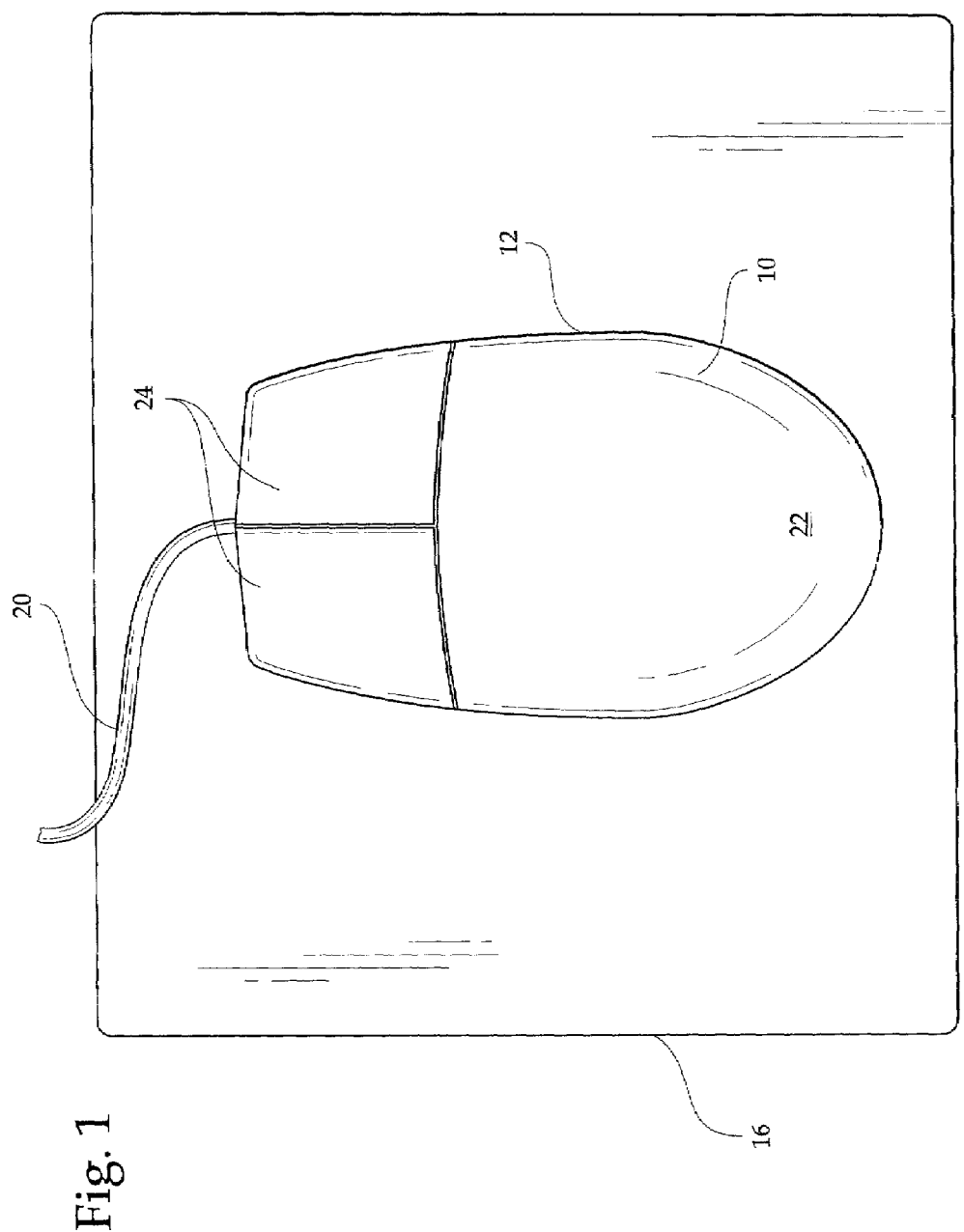

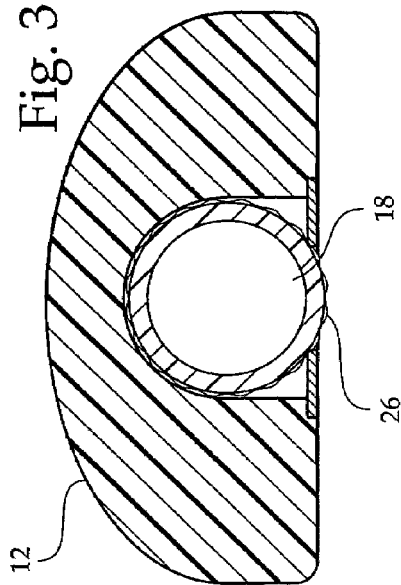
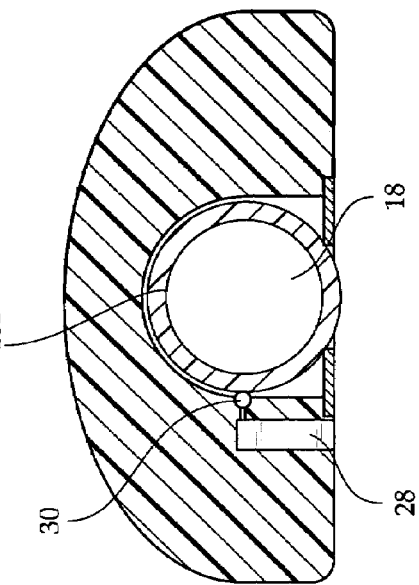
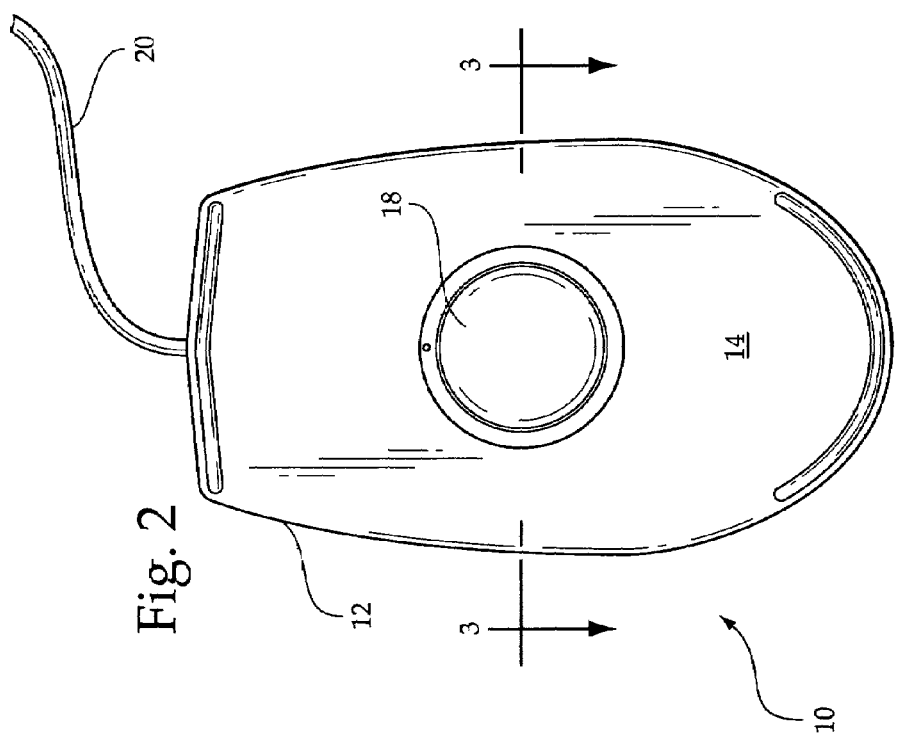

COMPUTER MOUSE WITH FRAGRANCE EMITTING MEANS

BACKGROUND OF THE INVENTION

The invention relates to a computer mouse with fragrance emitting means. In particular, the invention is a computer mouse equipped with fragrance particles that break down and are discharged as the mouse is used.

Recorded use of fragrances and perfumes dates back to as early as 1580 BC. The industry has experienced a surge of popularity over the past few decades with dozens of new fragrances introduced every year. Perfume companies are constantly looking for new means of disseminating their fragrances to the general public in an attempt to increase sales. Scent strips and free samples are just two ways that consumers are exposed to various scents.

An unexplored means of presenting scents to consumers is through the heart of modern technology, namely personal computers. Over the past decade, the personal computer has enjoyed increased popularity and has become a fixture in nearly every home and business. Because of the popularity of personal computers, it is a natural transgression to combine the functionality of a computer with the fashionableness of fragrance.

Modern computer systems have a two tiered input system: the keyboard is used for inputting data, and a pointer control device is used to select various objects depicted on the screen. The pointer control is used to open applications, pull down menus, move icons, and even draw pictures.

Because the pointer control device is such an important part of the user interface, a proliferation of such devices have been developed in an attempt at providing a more "user friendly" pointer control device. The most common pointer control device is the computer mouse. The mouse is a table-top device that translates movement upon the table to movement on the screen. Despite the availability of alternative pointing device, namely track balls, pen tablets, and touch screens, the mouse has remained the most widely used pointing device. Most computer users feel that it provides the greatest control over on-screen positioning and selection.

Thus, there exists a need for a computer mouse containing fragrance particles that may be emitted when moved along a mouse pad. Such a device would enable a computer user to enjoy his or her favorite scent while utilizing a computer.

U.S. Pat. No. 5,896,124 to Strandberg discloses a cleaning trackball for a computer pointing device, said device having a layer of fabric hotpressed onto the trackball.

U.S. Pat. No. 6,015,094 to Por discloses a vehicle perfume dispenser designed to release scents during the acceleration or deceleration of the vehicle.

U.S. Pat. No. 5,591,409 to Watkins shows an apparatus and method for providing aromas through the use of electronic activation means. By employing metered spray technology, aromatic chemicals are sprayed into the immediate vicinity of the operator.

While the available units may be suitable for the particular purpose employed, or for general use, they would not be as suitable for the purposes of the present invention as disclosed hereafter.

SUMMARY OF THE INVENTION

In view of the foregoing disadvantages inherent in the prior art, the present invention provides an improved computer mouse with fragrance emitting means. As such, the general purpose of the present invention, which will be described subsequently in greater detail, is to provide a new and improved computer mouse with fragrance emitting means which has all the advantages of the prior art and none of the disadvantages.

To attain this, the present invention essentially comprises a computer mouse having a housing with a bottom surface which rests upon a horizontal operating surface. A tracking device is positioned in the housing for generating pointer control data. A fragrance emitting means is contained within the housing of the computer mouse and is in communication with the tracking device. When the computer mouse is slid across the operating surface, the fragrance particles housed within the computer mouse are dispersed into the surrounding air.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved computer mouse with fragrance emitting means which has all the advantages of the prior art and none of the disadvantages.

It is another object of the present invention to provide a new and improved computer mouse with fragrance emitting means which may be easily and efficiently manufactured and marketed.

It is a further object of the present invention to provide a new and improved computer mouse with fragrance emitting means which is of durable and reliable construction.

An even further object of the present invention is to provide a new and improved computer mouse with fragrance emitting means which is susceptible of a low cost of manufacture with regard to both materials and labor, and which accordingly is then susceptible of low prices of sale to the consuming public, thereby making such computer mouse economically available to the buying public.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

FIG. 1 is a top plan view of the computer mouse according to the present invention.

FIG. 2 is a bottom plan view of the computer mouse according to the present invention.

FIG. 3 is a cross sectional view of the computer mouse illustrating the tracking device covered with thin rupturable sacs.

FIG. 4 is a cross sectional view of the computer mouse illustrating a refillable chamber in communication with the tracking device.

DETAILED DESCRIPTION OF THE PREFERRED EMBODIMENTS

FIGS. 1 and 2 illustrate a computer mouse 10. The computer mouse has a housing 12 having a bottom surface 14 which rests upon a horizontal operating surface 16, such as a mouse pad. The computer mouse 10 has a tracking device 18, having an outside surface 18S, for determining two dimensional movement of the mouse 10 along the operating surface 16, and generates pointer control data. This data is communicated to a computer central processing unit (CPU) through a connection cable 20. The computer mouse 10 has an upper surface 22, which includes one or more buttons 24, said buttons 24 used for clicking or selecting objects on a computer screen. In general, the computer mouse 10 described herein functions in a similar manner as any standard computer mouse.

A fragrance emitting means is contained within the housing 12 of the computer mouse 10, said means allowing fragrance particles to be dispersed upon movement of the mouse 10. As illustrated in FIG. 3, one workable example for the fragrance emitting means works with a mouse 10 wherein the tracking device 18 is a ball, the tracking device 18 thereby having an outside surface 18S having a plurality of thin sacs 26 positioned along the outside surface 18S of the tracking device 18. The sacs 26 are filled with scented particles. As the computer mouse 10 is guided over the operating surface 16, pressure exerted upon the sacs 26 by the operating surface 16 causes some of said sacs 26 to rupture, thereby releasing the fragrance into the surrounding air. Eventually, once all the sacs 26 are broken, a tracking device 18 with unruptured sacs may be replaced inside the computer mouse 10. In addition, changing the scent would simply involve replacing the ball.

FIG. 4 illustrates a second workable means, comprising a fragrance chamber 28 that is positioned in the housing 12, adjacent to the outside surface 18S of the tracking device 18. A small rotatable ball bearing 30 is situated between the chamber 28 and the tracking device 18 and is in communication with both. As the tracking device 18 is rolled along the operating surface 16, the movement causes the rotatable ball 30 to also move. As the ball bearing 30 rotates, it is coated with fragrance particles housed in the chamber 28. These particles are thereby transferred from the chamber 28, onto the ball bearing 30, and then onto the tracking device 18. As the tracking device 18 rotates, the particles are then emitted into the air.

With either means employed, any type of scented particle may be emitted from the computer mouse 10. Further, because of the construction of both means, upon exhaustion, replacement tracking devices or refills may be available to the consumer.

In conclusion, herein is presented a computer mouse with means incorporated therein for emitting fragrance particles into the air surrounding said mouse when moved upon a horizontal operating surface. The invention is illustrated by example in the drawing figures, and throughout the written description. It should be understood that numerous variations are possible, while adhering to the inventive concept. Such variations are contemplated as being a part of the present invention.

What is claimed is:

1. A computer mouse, comprising:
   a housing having an upper surface and a bottom surface;
   a tracking device, having an outside surface, for determining movement of the housing upon a horizontal operating surface;
   a fragrance chamber situated inside the housing adjacent to the tracking device, said chamber filled with scented particles, said chamber coupled to the tracking device so that movement of the tracking device causes the chamber to release scented particles.

2. The computer mouse as recited in claim 1, further comprising a small rotatable ball bearing situated between the chamber and the tracking device, said ball bearing in communication with the chamber and the tracking device.

3. The computer mouse as recited in claim 2, wherein upon movement of the tracking device upon a horizontal operating surface, the ball bearing becomes coated with scented particles contained with the chamber, the ball bearing then transfers these particles to the tracking device, and the particles are thereby emitted into the surrounding air.

* * * * *